C. A. BENBOW.
AUTOMATIC STOCK OR ANIMAL RELEASE.
APPLICATION FILED SEPT. 25, 1911.
1,027,307.
Patented May 21, 1912.
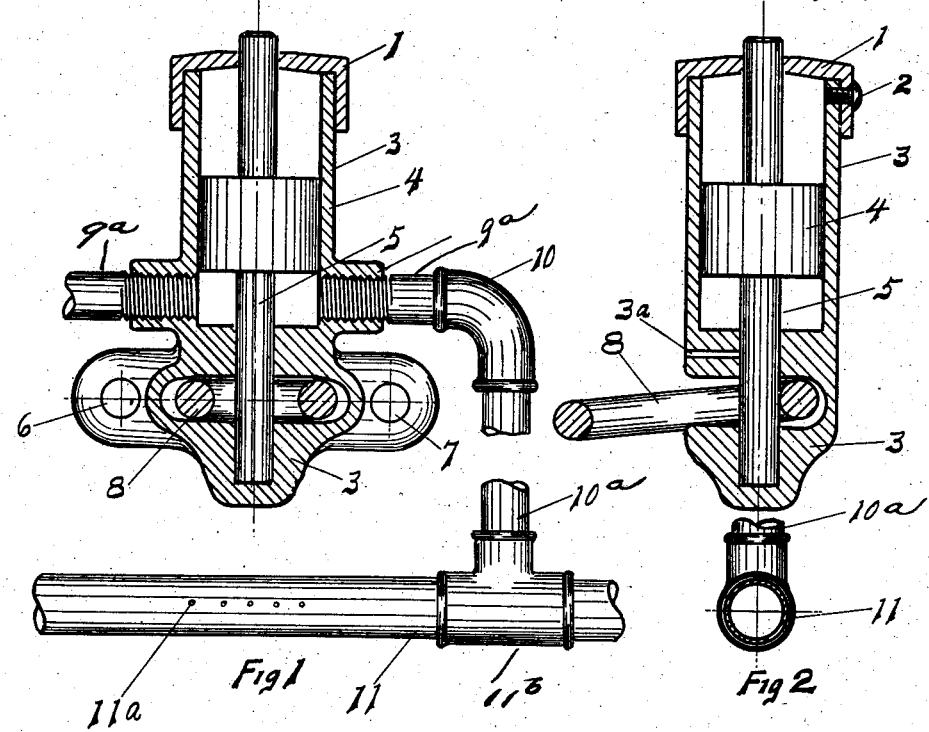
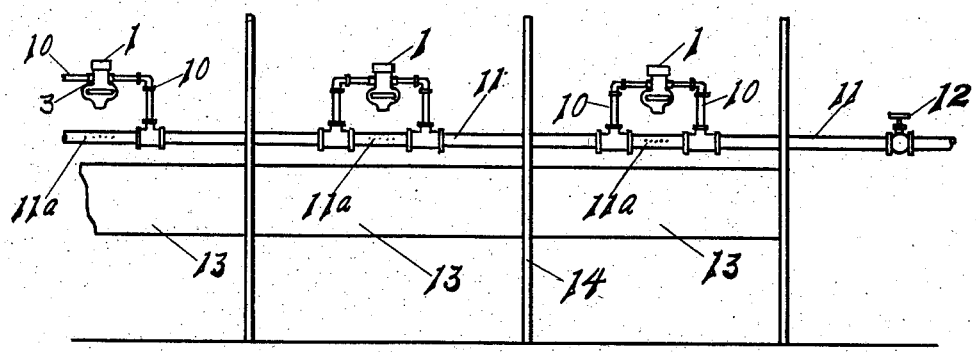

UNITED STATES PATENT OFFICE.

CHARLES A. BENBOW, OF PORTLAND, OREGON.

AUTOMATIC STOCK OR ANIMAL RELEASE.

1,027,307.    Specification of Letters Patent.    Patented May 21, 1912.

Application filed September 25, 1911. Serial No. 651,077.

*To all whom it may concern:*

Be it known that I, CHARLES A. BENBOW, a citizen of the United States, residing at Portland, county of Multnomah, and State of Oregon, have invented a new and useful Automatic Stock or Animal Release, of which the following is a specification.

My invention is for use in all places where stock or animals of any or all kinds are or may be stabled, or otherwise kept or secured, and is for the purpose of automatically releasing them from their stalls or sections or other places where they are secured or tied in case of fire or other catastrophe. I attain this by the mechanism illustrated in the accompanying drawing, in which—

Figure 1 is a vertical section through the mechanism illustrating the method of operation and its construction in detail; Fig. 2 is also a vertical section made in the opposite or ninety degree position from that shown in Fig. 1; Fig. 3 illustrates the method of attaching these automatic releases to the pipe from which the operating liquid is or may be secured.

Similar letters refer to similar parts throughout the several views.

1 is a head or cap which is secured to cylinder 3 by means of set-screw 2, but it is evident that head or cap 1 may be secured to cylinder 3 by other suitable means than that shown and I do not wish to confine myself specifically to this method.

4 is a piston operating within cylinder 3 having piston rod or stem 5 passing therethrough or otherwise attached. Piston rod or stem 5 passes through cap 1 and down through the lower portion of the base of cylinder 5 and into the sub-base of the same. The lower portion of the base of the cylinder 3 has two off-sets, one on either side, as shown in Fig. 1 through which are openings 6 and 7; these are for the purpose of attaching the automatic release to the wall or other bracket or support when the mechanism is installed for use. Passing around piston rod or stem 5 is a tie ring 8 to which the animal is directly secured by means of a rope or other suitable means. On either side of cylinder are two openings into which a hollow threaded member 9$^a$ is attached and to this member, elbow 10 is also secured, and attaching elbow 10 to the liquid pipe or conduit 11 is a nipple 10$^a$; this connection being made by means of a pipe tee 11$^b$. Directly beneath cylinder 3 in liquid pipe 11 are openings 11$^a$ through which the liquid will pass when the same is turned into the pipe 11 by the operation of cock 12. 13 and 14 are members composing the stall or stanchion into which the individual animal is placed.

The operation of my automatic stock or animal release is as follows: In case of fire or other catastrophe it is desired to automatically release the animals from their positions, cock 12 is opened, a liquid under pressure immediately enters pipe 11 and, therefore, pipes 10 and 9$^a$ and into cylinder 2 its operation on piston 3 raises the same to the upper end of cylinder 3, thus releasing ring 8 to which the animal is attached or secured. This same liquid forcibly emitting from openings 11$^a$ and 3$^a$ frightens the animal from its individual stall or stanchion.

Having thus described my invention, I wish to make the following claims therefor:

1. The herein described automatic animal releasing mechanism, consisting of a main supply pipe provided with perforations at suitable intervals, a series of three way couplings mounted upon the supply pipe, branch pipes leading vertically from the said couplings, a casing connected to each set of branch pipes and placed in communication with the supply pipe, the casing being provided with a sub-base portion having a recess therein, a tie ring arranged in said recess, and a piston head mounted in the casing and having a rod one portion of which is guided by the upper part of the casing and the lower portion of which is guided in the sub-base of the casing and normally retains the tie ring in place.

2. The combination with a vertically disposed cylinder having threaded offset flanges disposed at right-angles thereto, of a piston rod vertically slidable in the cylinder, a piston head carried thereby, a sub-base disposed directly beneath the cylinder, said sub-base having threaded offset flanges disposed at right-angles thereto, offset wing members provided with bolt openings for securing the device in operative position, a tie ring adjacent said offset wing members and inclosing the lower end of the piston rod directly beneath the piston head, a perforated supply pipe, a regulating valve therefor, pipe tees, a vertically extending branch pipe rising at right-angles to the supply pipe, a horizontally extending threaded delivery pipe secured between the threaded flanges of the cylinder and sub-base, and a threaded waste pipe secured between the said threaded flanges of the cylinder and base and arranged in oppositely disposed axial alinement with the delivery pipe.

In testimony that I claim the foregoing as my own, I hereunto attach my signature in the presence of two witnesses.

CHARLES A. BENBOW.

Witnesses:
 A. L. MacLeod,
 C. E. Nichols.

Copies of this patent may be obtained for five cents each, by addressing the "Commissioner of Patents, Washington, D. C."